UNITED STATES PATENT OFFICE.

MICHAEL J. CALLAHAN, OF PITTSFIELD, MASSACHUSETTS, ASSIGNOR TO GENERAL ELECTRIC COMPANY, A CORPORATION OF NEW YORK.

RESINOUS CONDENSATION PRODUCTS.

1,108,330.　　　　Specification of Letters Patent.　Patented Aug. 25, 1914.

No Drawing.　　Application filed February 8, 1913.　Serial No. 747,114.

*To all whom it may concern:*

Be it known that I, MICHAEL J. CALLAHAN, a citizen of the United States, residing at Pittsfield, county of Berkshire, State of Massachusetts, have invented certain new and useful Improvements in Resinous Condensation Products, of which the following is a specification.

In my prior application, Serial No. 696,704, filed May 11, 1912, I have described a resinous condensation product of phthalic anhydrid with glycerol, mannitol or other polyhydric alcohols. The resinous product described in this application is first obtained as a soluble, fusible brittle resin which upon further heating is converted to an insoluble and substantially infusible state. This second heat treatment must be carried out at a lower temperature range in order to get a clear, homogeneous resin free from bubbles. I have further discovered that when this insoluble, infusible resin is heated for a short time at a materially higher temperature or when the baking treatment at the lower temperature range is continued for a vary long time, a new, exceedingly strong, tough material is produced having a hardness and resiliency greater than vulcanized rubber and which is more chemically inert and of greater insulating value than the insoluble product described in my prior application.

As described in my former application, the resin is prepared by slowly heating to about 185° C., a mixture consisting by weight of about two parts of phthalic anhydrid and one part of glycerol, until distillation ceases. Heating is then continued at about 210° C. until small samples when cold are hard and brittle without stickiness. Heating of the mass is then discontinued. The resulting resin is fusible at about 120° C. The fusible, brittle product thus produced is then heated at a temperature of 85 to 135° C. until it becomes insoluble in the usual solvents with certain exceptions to be noted hereinafter. In case of a layer about $\frac{2}{10}$ inch in thickness the time required at the higher temperatures is about 15 to 20 hours. The resulting material while softening somewhat at elevated temperatures so as to permit bending, can then no longer be fused. While stronger than the fusible product it is still somewhat brittle. A slab about one-fourth inch in thickness can be broken by hand. Its hardness when tested by the Shore scleroscope shows it to be somewhat harder than hard rubber.

The following table shows the hardness of several well known materials tested in the same manner, in order to give comparable figures.

Copper............................................................. 10
Hard rubber....................................................... 67
Phthalic-glycerol resin............................................ 82
High speed steel................................................... 92
Tool steel......................................................... 98

These figures also take into account the resiliency of the material. The electrical insulating value of this hardened resin is quite high, being about 350 volts per mil. In order to test the chemical activity of this infusible resin a number of solvents were brought into contact with the same for 40 days at ordinary room temperature. The following table shows the effect at the end of this time.

*Dilute acids.*

Dilute nitric acid............Hydrolysis occurred upon the surface which became white and crumbly.
Dilute hydrochloric acid.....Very slight surface hydrolysis.
Dilute acetic acid...........No effect.
Dilute sulfuric acid.........Destroyed completely in a few days' time.

*Alkali.*

20% caustic alkali (sodium hydroxid)..................Almost completely destroyed.
20% alcoholic caustic potash..Surface was slightly attacked, becoming white and crumbly.

*Concentrated acids.*

Sulfuric acid................Completely destroyed.
Nitric acid..................Completely destroyed.
Hydrochloric acid............Surface attacked, white and crumbly.
Acetic acid..................No effect.

When in contact with water for several weeks the clear, insoluble, infusible resin became white and cheesy upon its surface. Exposed to weather for about three months, the surface was slightly attacked, becoming white and crumbly in places.

Organic solvents such as chloroform, ether, alcohols, benzol, turpentine, etc., have no effect even when in contact with the resin for forty days, but the resin can be completely dissolved in glycerin. When the resin is treated with acetone, no apparent solution takes place, but when the acetone is evaporated, it is found that a small component has been dissolved, as a slight sticky, gummy residue remains. In accordance with my present invention, this form of resin which for convenience may be termed the "intermediate" resin is further heated for about 5 to 10 hours to a temperature of about 180° to 250° C. the lower temperatures of this range requiring the longer time. The physical and chemical properties of the resinous material are changed by this higher heat treatment. According to my present knowledge this is due to a completion of the condensation reaction and also to the elimination of distillable alcohol such as glycerin, which appears to be present in the intermediate resin in the dissolved state. The hardness of the final hard material by the same standard as measured by the same scleroscope is increased from 82 to about 105. The tensile strength of the material is very greatly increased, being comparable to and even materially greater than that of hard rubber. This new form of resin is not only insoluble in the usual solvents, such, for example, alcohol, benzol, mineral or vegetable oils, chloroform, ether, carbon disulfid, carbon tetrachlorid and the like, but is completely insoluble in acetone. Like the intermediate infusible insoluble resin, it is soluble in glycerin.

Chemically the final resin is very inert, being substantially unattacked by cold water and even by cold and hot dilute or concentrated acids, with the exception of either hot or cold concentrated sulfuric acid and hot concentrated nitric acid. Titration of water in which the hardened resin has been boiled does show a slight acidity. The acidity, however, is too slight to be detected with acid-sensitive litmus paper. It is substantially unattacked at room temperatures by dilute or concentrated alkali, in aqueous or alcoholic solution, but is saponified by alkali when heated in contact therewith, regenerating the polyhydric alcohol, for example, glycerin in the particular case described, and yielding the phthalate of the alkali used for saponification. The insulating value of this new form of very tough, hard, resinous material is higher, the breakdown voltage at ordinary temperatures being about 370 volts per mil. The hardened resin is capable of mechanical working or machining. Finely ground it may be molded under pressure either alone or in combination with fillers, dyestuffs and the like. The hardened resin is somewhat leathery when heated to elevated temperatures, for example, above 140° C. This property may be utilized in working the resin as when bending impregnated coils, or taking impressions from a mold or die. The very hard, tough material may also be made on a small scale by another method. By continuing the heating of the glycerol-phthalic anhydrid reaction mixture beyond the point indicated above as suitable for interrupting the reaction to get the fusible resin, further distillation takes place. Unless care is observed a sudden ebullition takes place, and a substantially infusible, insoluble honey-combed, brittle, slag-like product is formed which is of little or no technical value. But when the reaction is carefully controlled so as to interrupt it just prior to the frothing stage, and then, by pouring into slabs, or layers, or otherwise lowering the temperature to about 200–210° C. and continuing the heating for several hours at this temperature the very hard, tough resin may be produced directly without passing through a distinct intermediate infusible stage. The reaction may be controlled by shaking the container when bubbling just commences, and when the bubbles can no longer be thus dispersed quickly lowering the temperature. The intermediate insoluble, infusible material described in my prior application may also be converted into the final hard form, by heating at about 135 to 150° C. for a very long time, at least several weeks.

As described in my co-pending applications, the fusible, soluble resin may be used for impregnating fibrous or cellular material either as an acetone solution, or in the fused state when containing naphthalene, anthracene, or the like. In this manner it may be introduced into electrical coils. The solvent is then evaporated and the material converted to the hard state, preferably first by heating at the lower temperature range and then at the higher range as already described.

The resin may be used for making various molded articles, such as electrical insulation, phonograph disks, buttons, combs, billiard balls, battery tanks and the like. For this purpose preferably the material hardened at the lower temperature range or the honeycombed product obtained by rapidly heating the fusible resin until bubbling occurs, is comminuted, molded under mechanical pressure and then is further hardened by heating to the higher temperature range, as described above.

What I claim as new and desire to secure by Letters Patent of the United States, is:—

1. A hard, tough, bubble free condensation product saponifiable by an alkali to form a phthalate and a polyhydric alcohol, being substantially chemically inert with respect to water.

2. A mechanically strong, machinable condensation product saponifiable by an alkali to form a phthalate and glycerol, said product being substantially inert with respect to cold water and being free from bubbles.

3. A tough, strong, homogeneous resinous material saponifiable with a hot alkaline solution to regenerate glycerol and form a phthalate, substantially chemically inert with respect to water and both dilute acid and dilute alkali at ordinary room temperatures and completely insoluble in acetone.

4. A tough, hard, resinous material produced by the condensation of a polyhydric alcohol and phthalic anhydrid, substantially chemically inert with respect to cold water and completely insoluble in acetone, and having at ordinary temperatures an electrical breakdown resistance of about 370 volts per mil.

5. A tough, hard, machinable resin produced by heating phthalic anhydrid and polyhydric alcohol until condensation of said ingredients takes place and until substantially all distillable alcohol is eliminated, said resin being characterized by complete insolubility in acetone and solubility in glycerin.

6. A strong, homogeneous, bubble free resin produced by the complete condensation of phthalic anhydrid and glycerol, all of the glycerol being in the combined state, said resin being chemically inert, of high insulating value and saponifiable to form a phthalate and glycerol.

7. The process which consists in heating a bubble-free infusible, insoluble condensation product of phthalic anhydrid and a polyhydric alcohol containing distillable polyhydric alcohol to a temperature at which said alcohol will distil and continuing the distillation until said resin is substantially free from distillable alcohol.

8. The process which consists in heating a fusible condensation product of phthalic anhydrid and glycerol at a temperature at which reaction occurs converting said resin to an infusible state but insufficient to cause a sudden ebullition and then after conversion to said infusible state heating to a higher temperature to further eliminate distillable material and strengthen said resin.

9. The process which consists in heating a fusible, soluble resin of phthalic anhydrid and a polyhydric alcohol at a temperature at which a clear infusible, insoluble product free from bubbles is produced which will not forth when heated, and then heating to a temperature of about 180 to 250° C. until a very hard, tough, strong product free from glycerin is formed.

10. The process which consists in heating a fusible, soluble resin of phthalic anhydrid and glycerol at about 85–150° C. sufficiently long to convert said resin to a hard, substantially infusible state and then heating at a higher temperature to further harden and toughen the resin.

In witness whereof, I have hereunto set my hand this fifth day of February, 1913.

MICHAEL J. CALLAHAN.

Witnesses:
ROBERT F. CHAMBERS,
JAMES N. LAWRENCE.